United States Patent
Bando et al.

(10) Patent No.: US 8,161,362 B2
(45) Date of Patent: Apr. 17, 2012

(54) TASK MANAGEMENT CONTROL APPARATUS AND METHOD, HAVING REDUNDANT PROCESSING COMPARISON

(75) Inventors: Akira Bando, Hitachi (JP); Shin Kokura, Hitachi (JP); Takashi Umehara, Hitachi (JP); Masamitsu Kobayashi, Hitachi (JP); Hisao Nagayama, Hitachi (JP); Naoya Mashiko, Hitachiota (JP); Masakazu Ishikawa, Hitachi (JP); Masahiro Shiraishi, Hitachi (JP); Akihiro Onozuka, Hitachi (JP); Hiromichi Endoh, Hitachi (JP); Tsutomu Yamada, Hitachinaka (JP); Satoru Funaki, Hitachi (JP)

(73) Assignees: Hitachi, Ltd., Tokyo (JP); Hitachi Information & Control Solutions, Ltd., Ibaraki (JP)

( * ) Notice: Subject to any disclaimer, the term of this patent is extended or adjusted under 35 U.S.C. 154(b) by 1272 days.

(21) Appl. No.: 11/447,724

(22) Filed: Jun. 7, 2006

(65) Prior Publication Data

US 2006/0282702 A1 Dec. 14, 2006

(30) Foreign Application Priority Data

Jun. 10, 2005 (JP) ................. 2005-170275
Jun. 30, 2005 (JP) ................. 2005-190874

(51) Int. Cl.
*G06F 11/00* (2006.01)
*G06F 7/02* (2006.01)

(52) U.S. Cl. ...................... 714/799; 714/819

(58) Field of Classification Search .............. None
See application file for complete search history.

(56) References Cited

U.S. PATENT DOCUMENTS

| 4,526,401 | A  | * | 7/1985  | Kakizaki et al. | 188/266.8 |
| 5,504,859 | A  | * | 4/1996  | Gustafson et al. | 714/11 |
| 5,802,266 | A  | * | 9/1998  | Kanekawa et al. | 714/11 |
| 6,009,453 | A  | * | 12/1999 | Sakaki | 718/107 |
| 6,092,217 | A  | * | 7/2000  | Kanekawa et al. | 714/11 |
| 6,334,201 | B1 | * | 12/2001 | Sawaguchi et al. | 714/795 |
| 6,356,821 | B1 | * | 3/2002  | Yoshida | 701/31 |
| 6,513,131 | B1 | * | 1/2003  | Kanekawa et al. | 714/11 |
| 6,615,366 | B1 |   | 9/2003  | Grochowski et al. | |

(Continued)

FOREIGN PATENT DOCUMENTS

JP 05-012052 1/1993

(Continued)

OTHER PUBLICATIONS

IEC 61508-1-7, "Functional safety of electrical/electronic/programmable electronic safety-related systems" part 1-7.

*Primary Examiner* — Van Nguyen
*Assistant Examiner* — Adam Lee
(74) *Attorney, Agent, or Firm* — Antonelli, Terry, Stout & Kraus, LLP.

(57) ABSTRACT

Processed results are received when processors make compatible computations on data of a common object. A computation command signal is generated and fed to the processors in response to a start signal from any one of the processors so that the processors can make computations with different operation timings. Then, the results of the computations made by the processors are compared with each other. Thus, apparatus capable of small size, high performance and safety at the same time can be achieved by the above construction using the processors.

14 Claims, 7 Drawing Sheets

U.S. PATENT DOCUMENTS

| | | | |
|---|---|---|---|
| 6,624,818 B1 * | 9/2003 | Mantor et al. | 345/522 |
| 6,636,949 B2 * | 10/2003 | Barroso et al. | 711/141 |
| 6,779,129 B2 | 8/2004 | Gregg et al. | |
| 7,472,336 B2 * | 12/2008 | Yanagisawa | 714/798 |
| 2002/0036848 A1 * | 3/2002 | Wilson | 360/25 |
| 2002/0073357 A1 * | 6/2002 | Dhong et al. | 714/19 |
| 2004/0154017 A1 * | 8/2004 | Emma et al. | 718/100 |
| 2005/0080529 A1 * | 4/2005 | Hashimoto et al. | 701/36 |
| 2006/0010282 A1 * | 1/2006 | Kim | 711/103 |
| 2006/0010340 A1 * | 1/2006 | Makela et al. | 714/5 |

FOREIGN PATENT DOCUMENTS

| | | |
|---|---|---|
| JP | 6-290066 | 10/1994 |
| JP | 08-241217 | 9/1996 |
| JP | 09-325899 | 12/1997 |
| JP | 2000-148524 | 5/2000 |
| JP | 3317776 | 6/2002 |
| JP | 2003-316598 | 11/2003 |
| JP | 2004-234144 | 8/2004 |
| WO | WO 2005/045664 | 5/2005 |

* cited by examiner

TASK MANAGEMENT CONTROL APPARATUS AND METHOD, HAVING REDUNDANT PROCESSING COMPARISON

BACKGROUND OF THE INVENTION

The present invention relates to a task management apparatus for control apparatus, input/output control apparatus, information control apparatus, task management method, input/output controlling method, and information controlling method.

The fields of Electronics and information technology have been developed, and the functions required for single apparatus have become complicated and compounded. The development of these fields and the function's complexity and compounding tendency made great contributions to widening the application of programmable electronic apparatus and to improving the reliability required at the same time.

For the commonly known high reliability, there are known methods of constructing multiple mechanisms or using a plurality of processors in the programmable electronic apparatus.

The regular-system/standby-system structure is known as a form of the multiple-mechanism programmable electronic apparatus. This structure is able to improve the availability because it can be switched to the standby system when a failure is found in the regular system.

On the other hand, JP-A-2004-234144 describes a programmable electronic apparatus using a plurality of processors for increasing the safety.

In addition, processing facilities having potential hazards such as atomic power plant and chemical plant employ protective means such as barriers for the passive countermeasure and a safety device such as an emergency shutdown device for the active countermeasure in order to reduce the influence of hazards on the workers and the peripheral environment in case of an accident. Of these countermeasures, the control means for the safety device or the like has so far been realized by electromagnetic/mechanical means such as relays. Recently, however, the technology in the control equipment that is programmable as represented by the Programmable Logic Controller (PLC) has been developed and thus demanded to use as control means for the safety control system.

The IEC 61508-1~7, "Functional safety of electrical/electronic/programmable electronic safety-related systems" part 1~part 7 (abbreviated IEC 61508) is the international standard issued according to this trend. It specifies the requirements for the electrical/electronic/programmable electronic safety-related system to be used in part of the safety control system. The IEC 61508 defines the Safety Integrity Level (SIL) as a measure of ability of the safety control system, or specifies requirements corresponding to levels 1 through 4. The higher level of SIL indicates the larger degree to which the processing installation is capable of reducing its potential risk. In other words, it means how much surely the processing equipment can implement the safety control when an abnormality is detected in the equipment.

Even if the safety control system is inactive in the normal operating condition, it is required to immediately become active when a trouble occurs in the processing installation. To this end, it is important to usually make self-examination, or to continue to check its own health, or good condition. In addition, the safety control system that needs high SIL is required to implement self-diagnosis over a wide range and with high precision in order to minimize the probability that the system becomes inactive due to a failure not detected.

In the IEC 61508, autognosis techniques are presented to use for each of the kinds of components that constitute the safety control system, and the effectivity of each technique is shown in a form of diagnostic rate. The diagnostic rate indicates the rate of detectable failures, when that autognosis technique is employed, relative to all failures that could occur in each constituent. In the diagnosis technique "Abraham" of RAM described in, for example, U.S. Pat. No. 6,779,128, it is said that the maximum diagnostic rate of 99% can be claimed.

In addition, as the failure detecting means for a processor as a single constituent, it is effective to employ a method of monitoring the matching between the output results from a plurality of monitors used.

As a method for mutually examining the outputs from a plurality of processors, it is effective to employ the means that each processor executes the same control processing at the same time and confirms that its output is coincident with those of the other processors.

As a typical example, JP-A-6-290066 describes a method in which two processors are operated in synchronism with each other and the same information is supplied as an input to the processors so that the outputs can be made coincident, thereby checking the excellent condition of the processors.

SUMMARY OF THE INVENTION

The reliability required for the programmable electronic equipment has factors of availability and safety. The availability is important for the control of equipment, and the safety is important for the protection of equipment. Since the means for realizing these two factors has the property of trade-off, it was difficult to satisfy both the availability and safety. Although a partial unit that takes charge of the availability and another partial unit responsible for the safety have respectively been provided to produce an apparatus, the apparatus has become not only large-sized, but also reduced in its reliability because the human factors become unreliable due to the multiplicity and complication of the running/maintenance operations.

The factors of the reliability required for the programmable electronic system are the availability and safety. The availability is a key component for the control of equipment, but the safety is weighty in the protection of equipment. The means for realizing these two factors includes many antimony portions.

Therefore, it has become standard practice to divide the apparatus into the partial units for the availability and safety. Thus, the apparatus has become not only large-sized, but reduced in its reliability because the human factors become unreliable due to the multiplicity and complication of the running/maintenance operations.

The control system that needs high safety, as disclosed in JP-A-6-290066, takes a method in which it verifies if the processors are in good conditions by checking the outputs of a plurality of processors, and produces an output to the following stages of memory and IO only when coincidence occurs.

According to this method, the operation timing of each processor is matched to each other, and the same control input information is also supplied to each processor so that the processor can produce the same output.

However, as the object to be controlled becomes complicated, the processors have come to be highly efficient. As a result, the control system comprised of a plurality of processors has the fear that the processors might produce no outputs of the same frequency and phase even if a single clock is supplied to the plurality of processors.

Thus, it is hard for the future control system comprised of a plurality of processors to synchronize the processor outputs. In order to check up on the outputs of the processors and diagnose the good or bad operation of the processors, it is necessary to take a method for checking the outputs irrespective of the synchronous or asynchronous outputs of the processors. In addition, in order to compare the outputs of the processors, it is necessary for the plurality of processors to execute a single process. Thus, the processing performance per processor can be reduced to half as much as the usual processing performance.

On the other hand, the programmable electronic system has been demanded not only for the reliability such as safety, but also for the improvement of convenience by speeding up the network processing and the normal control processing not required for such reliability as to get by checking up on the outputs of the processors. Particularly when the control processing is desired to make with high speed or when the network processing for treating a large amount of data is wanted to perform, the programmable electronic system has been required to divide into the component units for executing these processes and for making the process for the reliability.

It is an objective of the invention to provide apparatus and methods capable of solving any one of the above problems. Specifically, an apparatus having a plurality of processors is designed to achieve small size, high performance and safety, thus having high reliability.

It is another objective of the invention to provide a high-reliable programmable electronic system constructed to achieve all of small size, high performance and safety by using a plurality of processors.

According to the invention, to achieve the above objectives, there is provided an apparatus in which results are received that are obtained when at least two systems make compatible computations on data of a common object to be processed. In this apparatus, when a start signal is fed from at least either one of the two systems, a computation command signal is supplied to at least two systems.

In addition, there is provided an apparatus in which results are received that are obtained when at least two systems make compatible computations on data of a common object to be processed, and other results are received that are obtained when at least two systems make different computations on data of different objects to be processed. In this apparatus, a switching signal is generated that indicates that at least the two systems made different computations separately or compatible computations in a multiple way. When this signal indicates that the at least two systems made different computations, judgment is made to allow at least one of the results of the different computations to be supplied.

Moreover, there is provided a method in which results are received that are obtained when at least two systems make compatible computations on data of a common object to be processed. This method has a step of storing, in a first identification data region, identification data that identifies the object of which the data is processed by a predetermined one of at least the two systems, a step of storing, in a second identification data region, identification data that identifies the object of which the data is processed by the other one of at least the two systems, a step of storing, in a first processed data region, first processed data as a processed result from the predetermined one of at least the two systems, a step of storing, in a second processed data region, second processed data as a processed result from the other one of at least the two systems, a step of comparing the first identification data and the second identification data, and a step of comparing the first processed data and the second processed data.

In addition, there is provided an apparatus in which results are received that are obtained when at least two systems make compatible computations in a multiple way on data of a common object to be processed, and other results are received that are obtained when at least the two systems make different computations on data of different objects to be processed. In this apparatus, a switching signal is generated that indicates that at least the two systems made different computations or compatible computations.

More specifically, there is provided a programmable electronic system having an input/output device, a plurality of processors and a memory, this programmable electronic system further having provided therein a unit for switching the operation modes of the processors, a unit for comparing the outputs of the processors and a unit for protecting a memory region defined by a table from being written. The output-comparing unit is operated/stopped in accordance with the output from the operation mode-switching unit so that the memory-write protecting unit can be operated when the output-comparing unit is stopped.

With this construction, the processors can be independently operated when the output-comparing unit is stopped, thus increasing the controlled computation performance. In addition, the output that affects the safety can be prevented from being erroneously written. Moreover, when the output-comparing unit is operative, the danger-side signal output due to false computation by the processors can be prevented, thus improving the reliability.

In addition, the operation mode-switching unit has first and second timer counters. The first timer counter is started by a check operation start command and reset by check operation start signals from the plurality of processors. The second timer counter is reset and started by the check operation start signals from the plurality of processors. Then, an abnormal output is produced when the outputs from the two timer counters exceed a preset range.

This construction can detect that the output-comparing unit is stopped, and increase the reliability.

Moreover, a bus diagnosis unit is provided to diagnose the stuck disconnection of bus. The bus diagnosis is started under the condition that the independent operations of the plurality of processors have been completely finished. The diagnosis is normally finished under the condition that the comparing/checking process is started. Therefore, it is possible not only to prevent the processors from making erroneous computations, but also to prevent the danger-side signal output from being produced due to bus failure, thus increasing the reliability.

This output comparing unit includes a unit for detecting the end of the independent operations of the plurality of processors, a unit for generating operation start commands of a check operation program to the plurality of processors at intervals of a predetermined time, a command output unit for causing the next step of the check program to wait, a hold unit for holding the comparison signals from the plurality of processors, and a unit for comparing the comparison signals held in the hold unit. The program becomes active when the independent operations of the processors have been finished. The wait command to the processors operating ahead is released when the output to the hold unit has been finished. In addition, the wait command to the processors operating late is released at the end of the comparing process.

This construction can reduce the capacity for holding the comparison signals from the processors operating ahead. Moreover, the pipeline processing can speed up the computation, and holding and comparing operations. In addition, when the computations with relatively high reliability are requested, at least one of the plurality of processors is ordered to make computations with relatively high reliability away from the computation with relatively low reliability so that the processors can make the same computations. The results of the computations made by the plurality of processors are compared with each other, and the data associated with the computations of the processors is allowed to supply on the basis of the compared results.

Thus, small size, high performance, and safety can be achieved at the same time, and also the high reliability can be realized.

In addition to the reliability such as safety, it is possible to enhance the convenience by increasing the speed of the network processing and the normal control processing that does not need such reliability as to get by comparing the outputs from the processors.

Other objects, features and advantages of the invention will become apparent from the following description of the embodiments of the invention taken in conjunction with the accompanying drawings.

DESCRIPTION OF THE EMBODIMENTS

Embodiments of the invention will be described with reference to the accompanying drawings.

Figure 1:
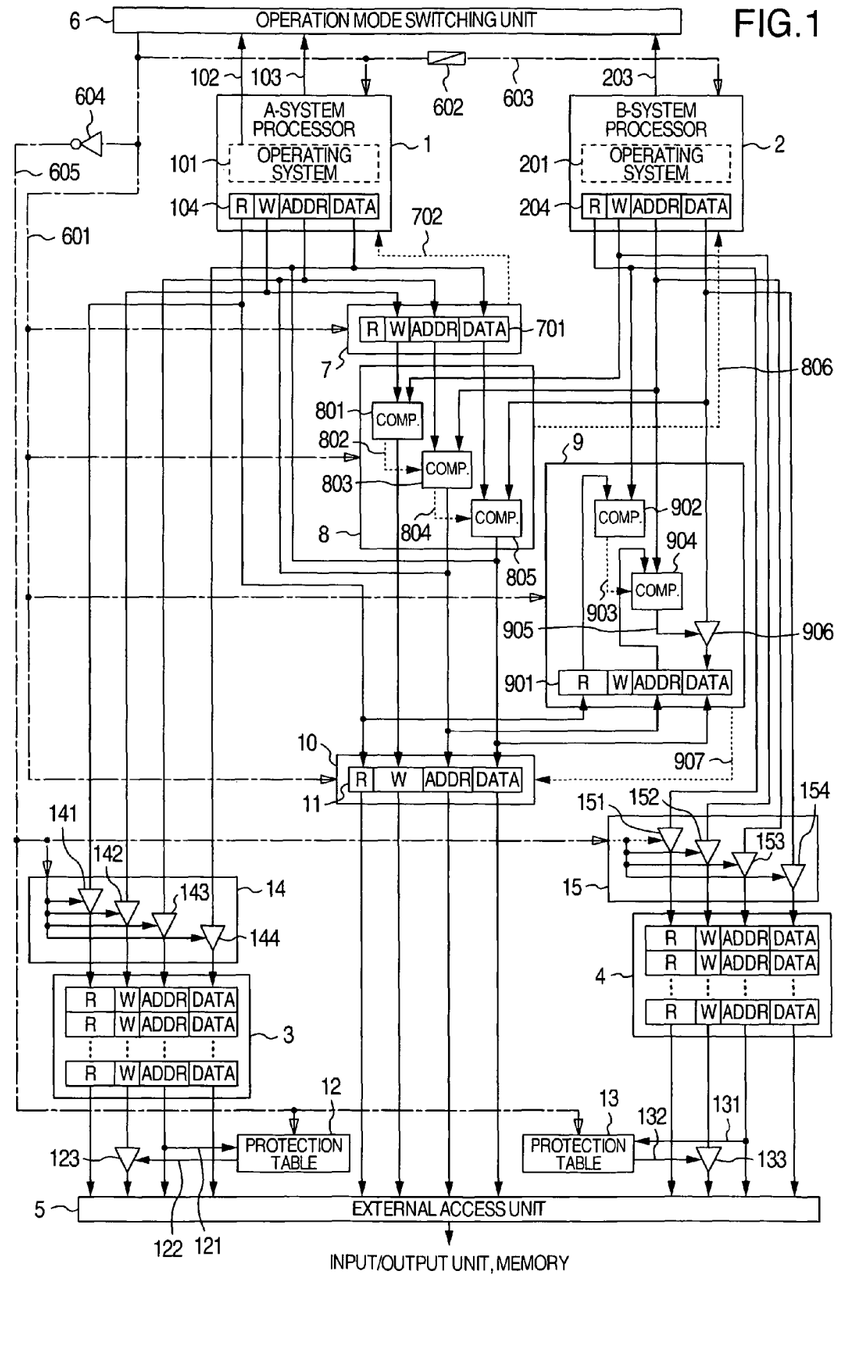
FIG. 1 is a diagram showing the whole construction of an embodiment of a control system according to the invention.

FIG. 1 is a diagram showing the construction of an embodiment of a programmable electronic apparatus according to the invention.

First, the whole construction and the operation of each portion will be described briefly.

As illustrated, a programmable electronic apparatus has two processors. An A-system processor 1 and a B-system processor 2 are respectively connected through buffers 3 and 4 to an external access unit 5. The external access unit 5 is connected to an input/output unit and a memory.

The A-system processor 1 and B-system processor 2 are operated in two alternate modes of check mode and independent mode under the control of an operation-mode switching unit 6.

In the check mode, the same program is executed on the A-system processor 1 and B-system processor 2. Before they supply their outputs to the external access unit 5, a data hold unit 7 and output check unit 8 confirm that the data from the A-system processor 1 and B-system processor 2 are coincident with each other. When data is supplied from the external access unit 5 to the inside, same data is supplied through a data synch unit 9 to the A-system processor 1 and B-system processor 2. The output data from and input data to the processors are respectively supplied through a check buffer unit 10 to and from the external access unit 5.

Either one of the data hold unit 7, output check unit 8, synch unit 9 and check buffer unit 10 is operated to produce a signal when a check mode command 601 becomes level H.

In the independent mode, different programs are respectively executed on the A-system processor 1 and B-system processor 2. The input to and output from the A-system processor 1 are supplied through the buffer 3 from and to the external unit 5, respectively. A protection table 12 operates in the independent mode, and inhibits the writing when the address data of the buffer 3 is within a previously defined protection range of a physical address page. Similarly, the input to and output from the B-system processor 2 are supplied through the buffer 4 from and to the external unit 5, respectively, and a protection table 13 inhibits data from being written in the protection range.

Output switch units 14 and 15 cause the input signals from registers 104 and 204 to be supplied to output buffers 3 and 4 only when an output 605 from a NOT gate 604 is level H.

The operation of each portion will be described in detail with reference to FIGS. 1 and 3.

First, an operating system 101 of the A-system processor 1 issues a check mode start command 102 of level H to the operation-mode switching unit 6 (t1). The operation-mode switching unit 6 that has received the check mode start command 102 generates a check mode command 601 (level H) (t4) if check mode ready signals 103 and 203 from the A-system and B-system processors 1 and 2 are of valid level (level H)(t2, t3). Thus, the A-system processor starts the check mode computation (t5). The check mode ready signal 103 is reset by the leading edge, or start of the check mode computation 105 (t6).

Here, the check mode ready signals 103 and 203 are produced under the condition that the A-system processor 1 and B-system processor 2 finish the independent mode computation and that a cache memory is cleared. Thus, it is possible to eliminate the computation-time deviation due to the different program operations before the start of the check mode.

The check mode command 601 is fed directly to the A-system processor 1, while a signal 603 resulting from delaying it by an amount of a set time (Td) through a timer circuit 602 is supplied to the B-system processor 2 (t7). Thus, the B-system processor is started to make the check mode computation (t8). The check mode ready signal 203 is reset by the leading edge of the check mode computation 205 (t9).

The delay time is set to be two bus cycles of operation mode switching unit 6 so that the computation operation of A-system processor can be always ahead and that the computation lag due to the check can be minimized.

The output data checking operation will be described.

The output from a register 104 of A-system processor 1 is written in a register 701 of the data hold unit 7. When the writing in the register 701 is finished, a write wait signal 702 is released, thus allowing data to be again written in the register 104 of A-system processor 1.

On the other hand, when a comparator 801 of the output check unit 8 verifies that the write control signal W of a register 204 of B-system processor 2 and the write control signal W of the register 701 are coincident, it supplies the write control signal W to a register 11 of the check buffer unit 10. At the same time, a wait signal 802 is released, thus allowing a comparator 803 to produce its output.

When the comparator 803 confirms that the address signal 701 fed from the A-system processor 1 and held in the register 701 and the address signal 204 from the B-system processor 2 are coincident, it supplies the address signal to the register 11 of check buffer unit 10. At the same time, a wait signal 804 is released, thus allowing a comparator 805 to produce its output.

When the comparator 805 verifies that the data 701 fed from the A-system processor 1 and held in the register 701 and the data 204 from the B-system processor 2 are coincident, it supplies the data signal to the register 11 of check buffer unit 10. At the same time, a wait signal 806 from the output check unit 8 is released, thus allowing the register 204 of B-system processor 2 to again write.

The input data distributing operation will be described next. The read control signal R of the register 104 of A-system processor 1 is transmitted through the read control signal R of the register 11 of check buffer unit 10 to the external access unit 5. The address and data signals are supplied through the register 11 and read into the register 104.

The data of register 11 is transmitted to a register 901 of data synch unit 9. A comparator 902 checks if the read-in control signal R of register 901 is coincident with the read-in control signal R of register 204 of B-system processor 2. If they are coincident, a wait signal 903 is released. A comparator 904 checks if the address signal of register 901 is coincident with the address signal of register 204. If they are coincident with each other, a wait signal 905 is released so that a gate circuit 906 is operated. Thus, the data signal of register 901 is transmitted to register 204. Then, a wait signal 907 is released, thus allowing the check buffer unit 10 to rewrite.

When it is detected that the A-system processor finishes the check mode computation (t10) and that the B-system processor finishes the check mode computation (t11), the check mode command 601 becomes level L (t12), and the check mode command 603 is also turned level L by an AND gate 620. Thus, the independent operation mode starts (t14).

Figure 3:
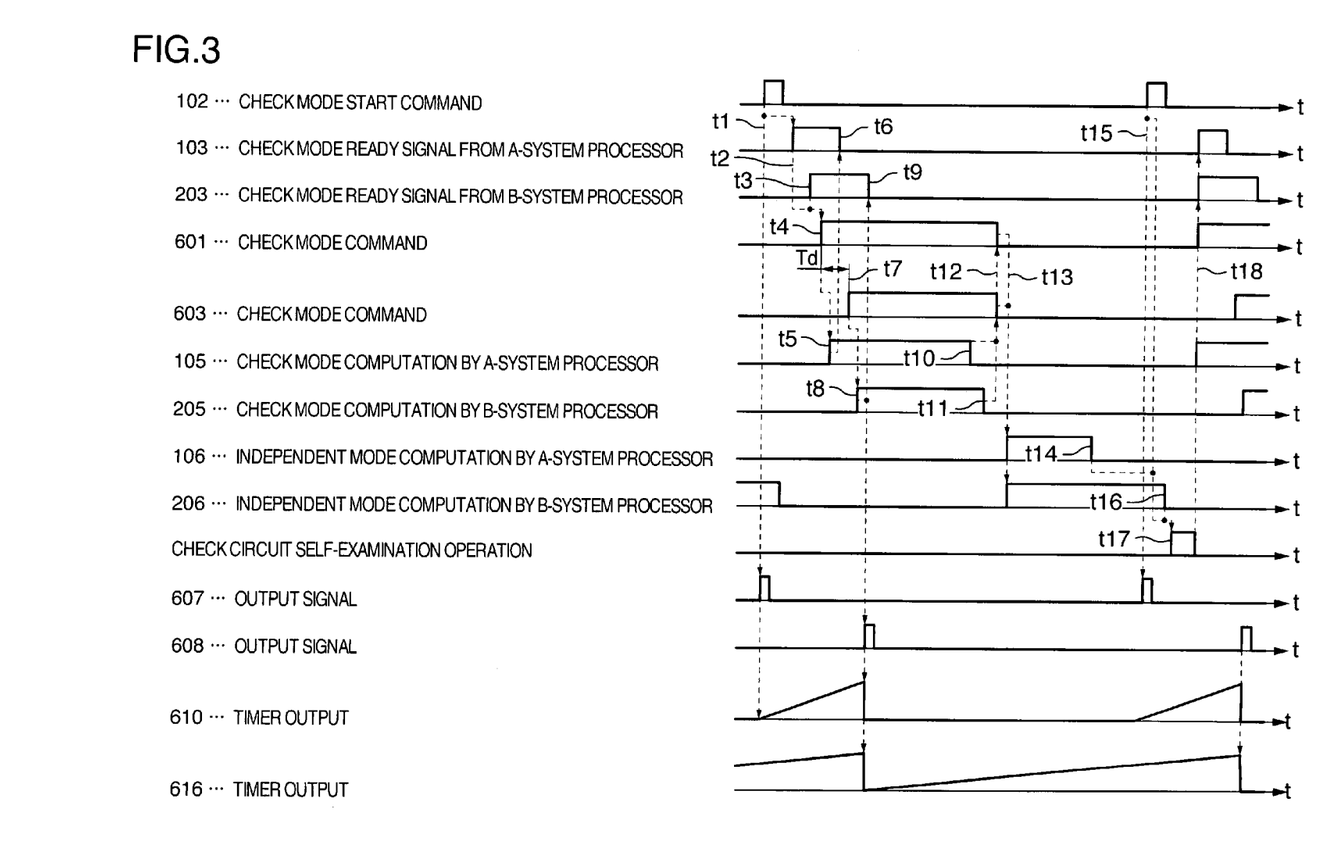
FIG. 3 is a timing chart showing the operation of each portion.

The diagram of FIG. 3 shows that the B-system processor still continues the independent computation mode 206 when the A-system processor finishes the independent mode computation 106 (t14) and the check mode start command 102 again rises up (t15). In this case, when it is detected that the B-system processor finishes the independent mode computation 206 (t16), the check circuit starts the self-diagnosis operation (t17). After the end of the self-diagnosis operation, the check mode ready signal 103 to the A-system processor 1 and the check mode ready signal 203 to the B-system processor 2 become level H (t18). Thus, since the check circuit makes the self-diagnosis operation just before the check mode computation, the check circuit can enhance the safety.

The output switch units 14 and 15 are respectively comprised of gate circuits 141 through 144, and 151 through 154, thus enabling data to be inputted and outputted between the register 104, 204 and the buffer 3, 4 when the inverted signal 605 of the check mode command 601 is level H.

The protection tables 12 and 13 become active when the inverted signal 605 of the check mode command 601 is level H, and refer to the address signals 121 and 131 to produce access protection signals 122 and 132 when they are within a predetermined physical address range. These access protection signals 122 and 132 control gate circuits 123 and 133 with NOT circuits to stop the writing in the protective range.

Therefore, the results obtained from the check mode computation can be protected from being affected at the time of the independent mode computation.

Figure 2:
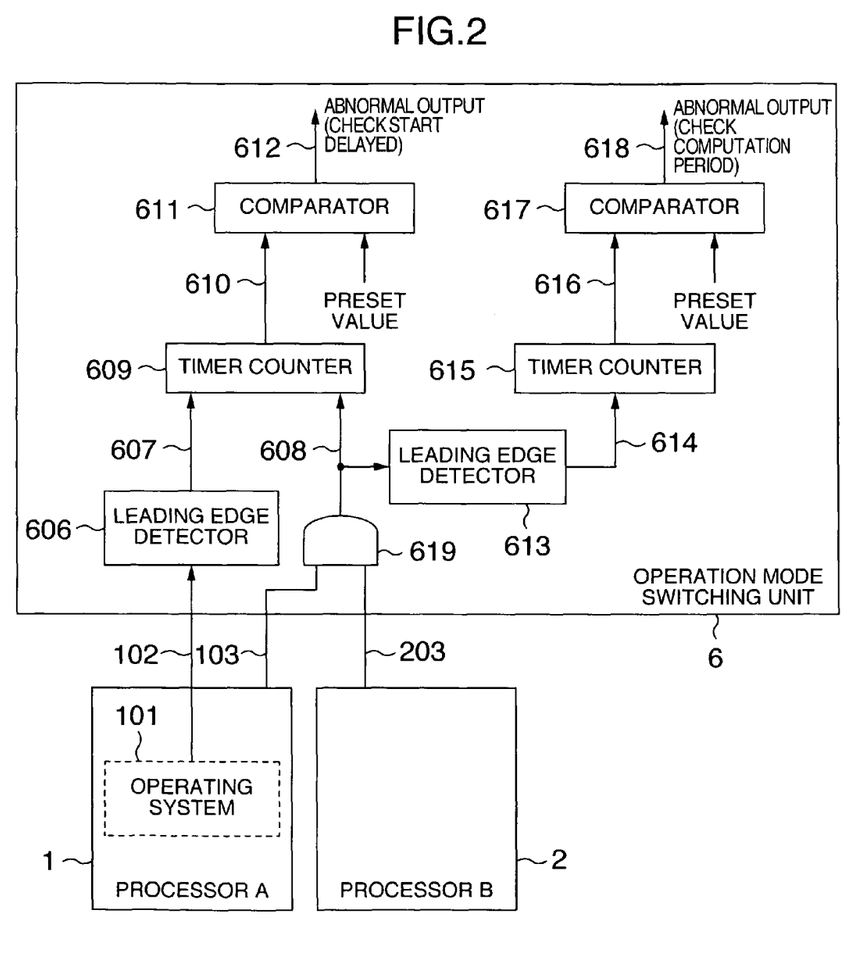
FIG. 2 is a diagram showing an example of the operation mode switching unit as another embodiment according to the invention.

FIG. 2 shows an embodiment of an operation mode switching unit according to the invention.

A leading edge detector 606 receives the check mode start command 102 from the operating system 101 of A-system processor 1, and detects a set pulse signal 607, by which a timer counter 609 is started. When the check mode ready signals 103 and 203 from the A-system processor 1 and B-system processor 2 are supplied to an AND gate 619, the AND gate produces an output signal 608, by which the timer counter 609 is reset. The timer counter 609 supplies an output 610 to a comparator 611, and the comparator 611 produces an abnormal output 612 when the output 610 exceeds a preset range. Thus, the delay at the time of the check operation can be detected.

A timer counter 615 is provided to start just when it is reset by a pulse signal produced from a leading edge detector 613 that receives the output signal 608 from the AND gate 607.

The timer counter 615 supplies an output 616 to a comparator 617, and the comparator 617 produces an abnormal output 618 when the output 616 exceeds a preset range. Thus, it is possible to detect the abnormality of the check computation period.

In the above embodiment, a bus diagnosis unit for examining a stuck disconnection of bus is provided to start its operation when the independent operations of the plurality of processors have been completely finished. In this case, when the diagnosis operation is normally finished, the comparison check process can be started. Thus, not only the computation error in the processors but also a danger-side signal output due to the failure of bus can be prevented, so that the reliability can be enhanced.

This output check processing is implemented by an independent operation end detecting unit for detecting the end of the independent operations of the plurality of processors, a unit for generating check operation program start commands of different timings to the plurality of processors, a command output unit for making the next step of the check program wait, a hold unit for holding the comparison signals from the plurality of processors, and a comparing check unit for comparing and checking the comparison signals held in the hold unit. When the independent operations of the plurality of processors have been completely finished, the program is started to operate. The standby commands to the processors operating ahead are released when the outputs have been completely fed to the hold unit. In addition, the standby commands to the processors operating late are released when the comparing and checking processes have been finished.

This construction makes it possible to reduce the amount of capacity for holding the comparison signals from the processors operating ahead. In addition, the pipeline processing can speed up the operations of computation, holding and comparison.

Another embodiment of the invention will be described briefly. A control system that needs high reliability and high performance has a function to cause a plurality of processors to operate when high reliability is required, so that the processors can be examined if they have good conditions by comparing the outputs, and has another function to cause the processors to perform independent processes, thereby improving the performance. That is, it realizes the comparison between the outputs from CPUs.

More specifically, this embodiment has the following features.

(1) A single control system has a plurality of processors, a unit for judging whether the IO to which each processor accesses is expected to have highly reliable control results, a unit for comparing the outputs from the plurality of processors and judging whether the outputs coincide with each other, and a unit for making the operations that the access of the processors to the IO that is expected to have highly reliable control results is allowed to make at least only when the output results from the plurality of processors are coincident with each other, but the access is waited, when a single one of the processors accesses, until the other processors produces the same output result.

(2) Each of the plurality of processors provided within the single control system has a unit for executing the process of a different function, and a unit for making another processor suspend.

(3) The processor that executes the process to output to the IO that requires high reliability has a unit that causes another processor to interrupt its process by using the unit for making another processor suspend and that executes the process to output to the IO that requires high reliability.

Figure 4:
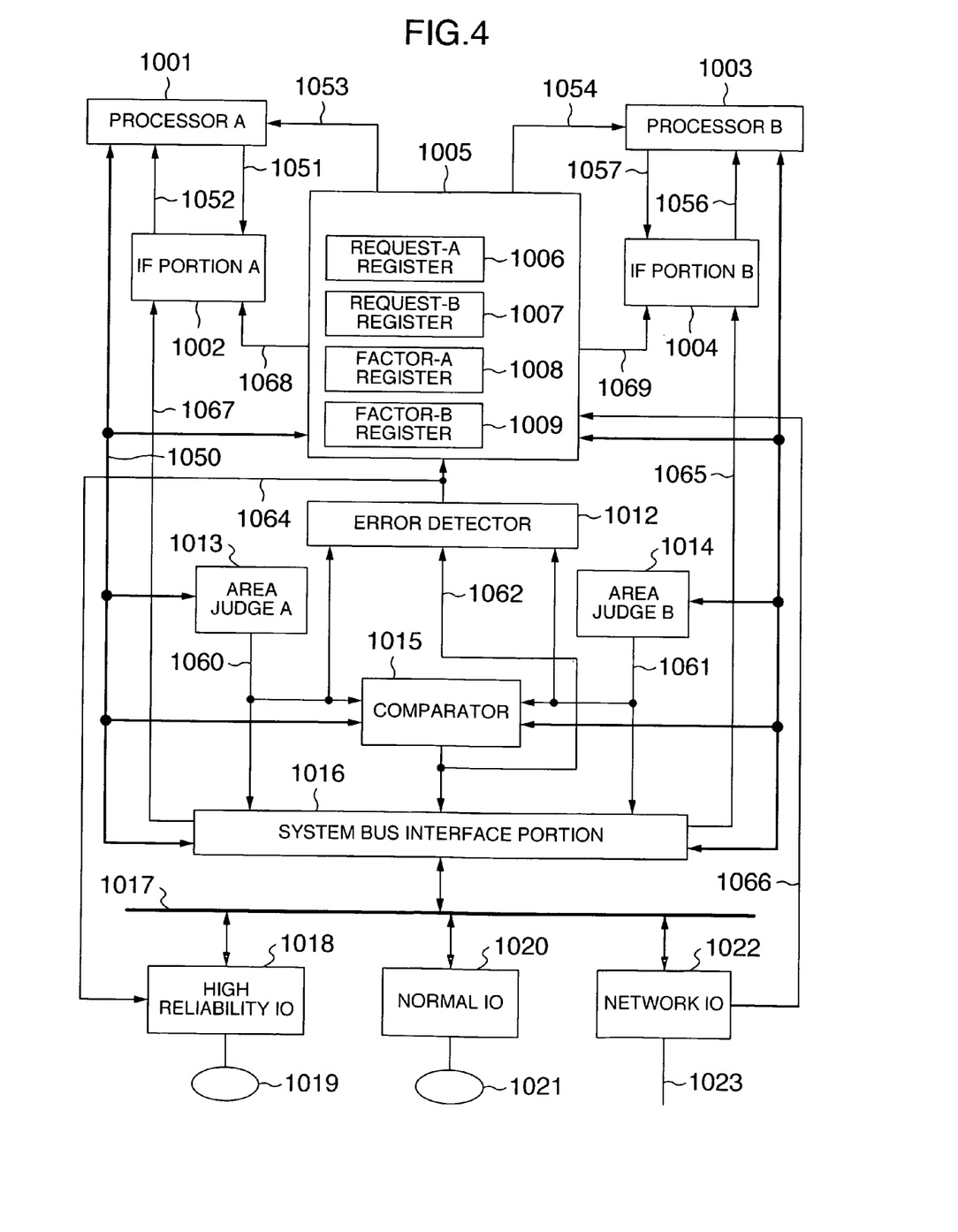
FIG. 4 is a diagram showing an example of the computing system as still another embodiment according to the invention.

Further embodiment of the invention will be described in detail with reference to FIG. 4. FIG. 4 shows the construction of the control system of this embodiment according to this invention. Although two processors are used in this embodiment, this embodiment can have an arbitrary number of processors that do not restrict the invention.

In addition, it is assumed that the control system to be described here is connected to a memory circuit, but this is not particularly stated.

It is assumed that the A-system processor 1001 executes a control task and that the B-system processor 1003 executes a communication task. In addition, the A-system processor 1001 and the B-system processor 1003 are not always necessary to synchronously operate at the same frequency and in the same phase.

The A-system processor 1001 outputs an address signal and data signal on an A-system processor bus 1050. In addition, the A-system processor 1001 asserts a bus start signal 1051 at the time of beginning bus access. An A-system interface portion 1002 continues to assert an A-system wait signal 1052 until an A-system bus ready signal 1067 or an A-system interruption control ready signal 1068 is asserted. When the A-system processor 1001 executes write access, the A-system processor 1001 continues to output address and data to the A-system processor bus 1050 while the A-system wait signal 1052 is being asserted. When the A-system processor 1001 executes read access, the A-system processor 1001 continues to output address to the A-system processor bus 1050 and to wait read data while the A-system wait signal 1052 is being asserted. When the A-system wait signal 1052 is negated, the A-system processor 1001 receives the data on the A-system processor bus 1050 as a read value.

The same operations are performed for the B-system processor. The B-system processor 1003 supplies an address signal and data signal on a B-system processor bus 1055. In addition, the B-system processor 1003 asserts a bus start signal 1057 at the time of beginning bus access. A B-system interface portion 1004 continues to assert a B-system wait signal 1056 until a B-system bus ready signal 1065 or a B-system interruption control ready signal 1069 is asserted. When the B-system processor 1003 executes write access, the B-system processor 1003 continues to supply the address and data to the B-system processor bus 1055 while the wait signal 1056 is being asserted. When the B-system processor 1003 executes read access, the B-system processor 1003 continues to supply the address to the B-system processor bus 1055 and to wait read data while the wait signal 1056 is being asserted. When the wait signal 1056 is negated, the B-system processor 1003 receives data on the B-system processor bus as read value.

An A-system area judge 1013 has a function to judge whether the device to be currently accessed is a highly reliable IO 1018 by the value of address on the A-system processor bus 1050. When the A-system processor 1001 makes access to the highly reliable IO 1018, the judge 1013 asserts an A-system highly reliable access signal 1060.

A B-system area judge 1014 has a function to judge whether the device to be currently accessed is the highly reliable IO 1018 by the value of address on the B-system processor bus 1055. When the B-system processor 1003 makes access to the highly reliable IO 1018, the B-system area judge 1014 asserts a B-system highly reliable access signal 1061

A comparator 1015 has a function to compare the A-system processor bus 1050 and B-system processor bus 1055. The comparator compares the address, access-type of either write or read and write data on the A-system processor bus 1050 with those on the B-system processor bus 1055. If those are coincident with each other, the comparator 1015 asserts a compared-result coincident signal 1062.

A system bus interface portion 1016 makes access to the highly reliable IO 1018, normal IO 1020 and network IO 1022 through a system bus 1017 according to the A-system processor bus 1050, B-system processor bus 1055, A-system highly reliable access signal 1060, B-system highly reliable access signal 1061 and compared-result coincident signal 1062.

The highly reliable IO 1018 is connected to an input/output device 1019 that is required to have high reliability.

The normal IO 1020 is connected to an input/output device 1021 that will be enough if it has normal reliability.

The network IO 1022 takes interface to a network 1023, and when it requires a process by a processor such as receiving process, it asserts a network interrupt 1066, expecting the processor to process.

An error detector 1012 has a function to judge whether the A-system processor 1001 and B-system processor 1003 normally operate or fail according to the A-system highly reliable access signal 1060, B-system highly reliable access signal 1061 and compared-result coincident signal 1062. If the error detector 1012 judges that a trouble occurs, it asserts a failure report signal 1064.

An interrupt control portion 1005 has a function to control an A-system interrupt signal 1053 to A-system processor 1001 and an interrupt signal 1054 to B-system processor 1003. The interrupt control portion 1005 also has an A-system interrupt request register 1006 that asserts the A-system interrupt signal 1053 and an A-system interrupt factor register 1008 that indicates the factor of interrupt. In addition, the interrupt control portion 1005 has a B-system interrupt request register 1007 that asserts the B-system interrupt signal 1054 and a B-type interrupt factor register 1009 that indicates the factor of interrupt.

It is constructed to be able to interrupt the A-system processor 1001 or B-type processor 1003 separately. In addition, the A-system interrupt request register 1006, A-system interrupt factor register 1008, B-system interrupt request register 1007 and B-system interrupt factor register 1009 are constructed to be able to be accessed from the A-system processor 1001 and B-system processor 1003.

In addition, the failure report signal 1064 and network interrupt 1066 are fed from the outside. The A-system interrupt signal 1053 transmits the interrupt produced from the A-system interrupt request register 1006 or from the failure report signal 1064. Here, the interrupt produced from the failure report signal 1064 takes priority over that produced from the A-system interrupt register 1006.

The B-system interrupt signal 1054 transmits the interrupt produced from the B-system interrupt request register 1007, the network interrupt 1066 or the interrupt produced from the failure report signal 1064. Here, the interrupt produced from the failure report signal 1064 takes priority over that produced from the B-system interrupt request register 1007. The interrupt produced from the B-system interrupt request register 1007 takes priority over the network interrupt 1066. In other words, the order of priority is the interrupt produced from the failure report signal 1064, the interrupt produced from the B-system interrupt request register 1007, and the network interrupt 1066.

Figure 5:
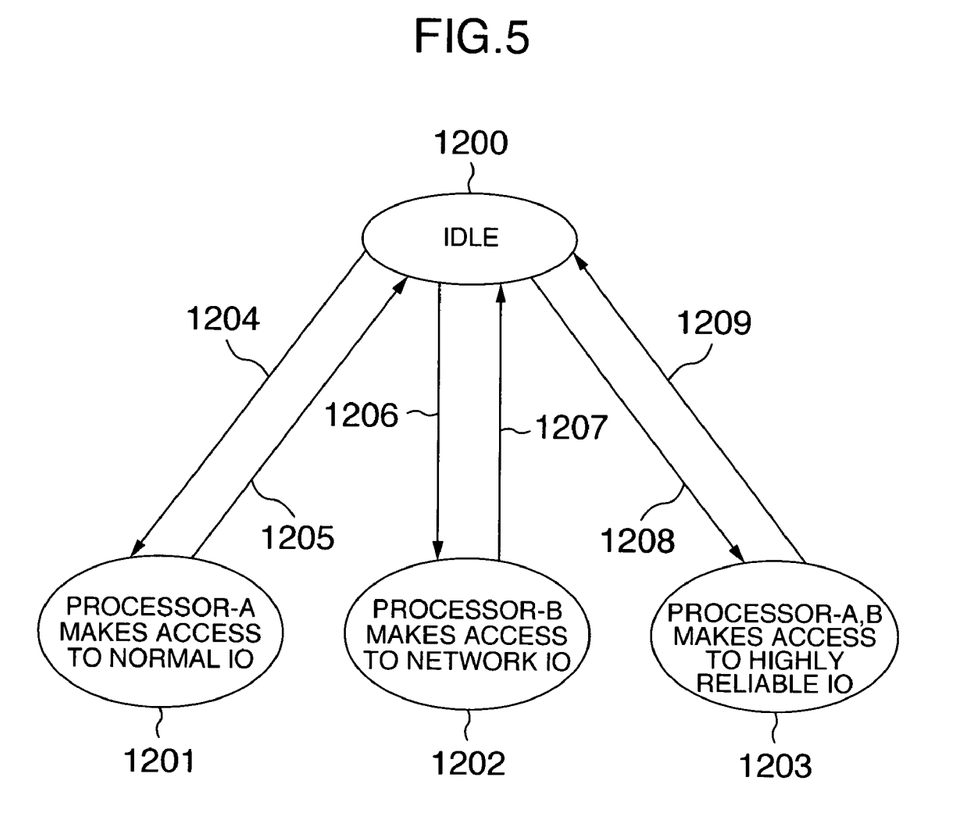
FIG. 5 is a state transition diagram showing the operation of the system bus interface portion of the above embodiment according to the invention.

FIG. 5 is a state transition diagram showing the operation status of system bus interface portion 1016.

The system bus interface portion 1016 has the four states as shown in FIG. 5.

The state 1200 indicates idle status in which the A-system processor 1001 and B-system processor 1003 both do not make access to the system bus 1017.

The state 1201 indicates A-system processor's access status in which the A-system processor 1001 makes access to the normal IO 1018.

The state 1202 indicates B-system processor's access status in which the B-system processor 1003 makes access to the network IO 1022.

The state 1203 indicates the status in which the A-system and B-system processors make access to the highly reliable IO 1018.

The transition condition 1204 under which the state 1200 shifts to state 1201 is satisfied under the condition that the A-system processor 1001 starts to access and that the A-system highly reliable access signal 1060 is not asserted.

The transition condition 1206 under which the state 1200 shifts to state 1202 is satisfied under the condition that the A-system processor 1001 does not start to access, that the B-system processor 1003 starts to access, and that the B-system highly reliable access signal 1061 is not asserted.

The transition condition 1208 under which the state 1200 shifts to state 1203 is satisfied under the condition that the A-system processor 1001 starts to access, that the A-system highly reliable access signal 1060 is asserted, that the B-system processor 1003 starts to access, that the B-system highly reliable access signal 1061 is asserted, and that the compared-result coincidence signal 1062 is asserted. This condition indicates that the A-system processor 1001 and B-system processor 1003 both make access to the same address of the highly reliable IO 1018.

The transition condition 1205 is satisfied by the report of access completion sent from the normal IO 1020 through the system bus 1017. The transition condition 1207 is satisfied by the report of access completion sent from the network IO 1022 through the system bus 1017. The transition condition 1209 is satisfied by the report of access completion sent from the highly reliable IO 1018 through the system bus 1017.

Under these state transitions, the system bus interface portion 1016 responds to the requests from the A-system processor 1001 and B-system processor 1003 according to the results of judgment from the A-system area judge 1013 and B-system area judge 1014, thus allowing them to make access to either one of the highly reliable IO 1018, normal IO 1020 and network IO 1022 connected to the system bus 1017. Particularly, the access to the highly reliable IO 1018 must satisfy the transition condition 1208 in which both of the A-system processor 1001 and B-system processor 1003 make access to the same address of highly reliable IO 1018.

In addition, the A-system bus ready signal 1067 is asserted when the transition conditions 1205 and 1209 are satisfied, and the B-system bus ready signal 1065 is asserted when the transition conditions 1207 and 1209 are satisfied.

Figure 6:
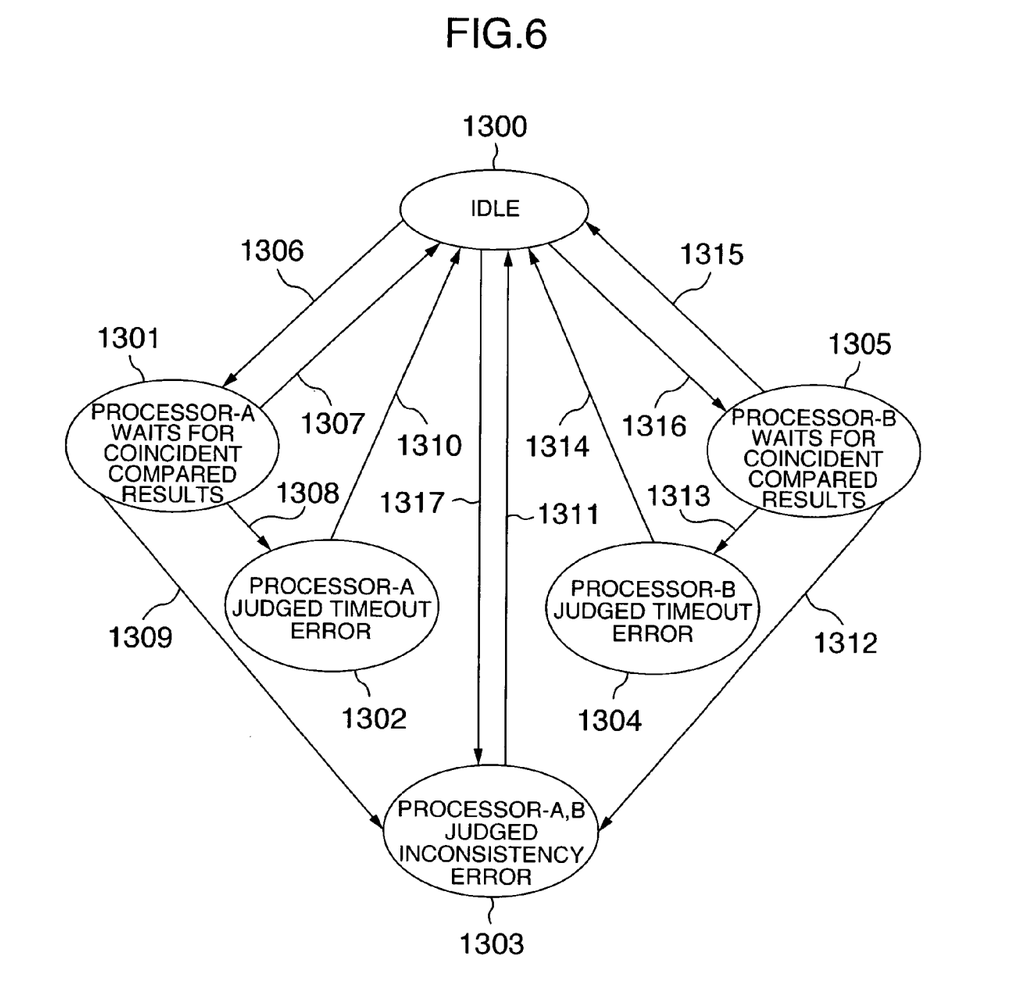
FIG. 6 is another state transition diagram showing the operation of the error detection unit of the above embodiment according to the invention.

FIG. 6 is a state transition diagram showing the operation of the error detector 1012.

The state 1300 indicates the idle condition in which the A-system processor 1001 and B-system processor 1003 both do not make access to the highly reliable IO 1018.

The state 1301 indicates the condition in which the A-system processor 1001 makes access to the highly reliable IO 1018 and waits for the B-system processor 1003 to produce the same output as that from the A-system processor 1001.

The state 1302 indicates the condition in which the A-system processor 1001 makes access to the highly reliable IO 1018, and waits for the B-system processor 1003 to produce the same output as that from the A-system processor 1001, but it is judged to be timeout error after the lapse of a constant time.

The state 1303 indicates the condition in which the A-system processor 1001 and B-system processor 1003 make access to the highly reliable IO 1018, but the outputs from those processors are not coincident, or it is judged to be error.

The state 1305 is the condition in which the B-system processor 1003 makes access to the highly reliable IO 1018 and waits for the A-system processor 1001 to produce the same output as that from the B-system processor 1003.

The state 1304 is the condition in which the B-system processor 1003 makes the highly reliable IO 1018, and waits for the A-system processor 1001 to produce the same output as that from the B-system processor 1003, but it is judged to be timeout error after the lapse of a constant time.

The transition condition 1306 is satisfied under the condition that the A-system highly reliable access signal 1060 is asserted but the B-system highly reliable access signal 1061 is not asserted.

The transition condition 1307 is satisfied when the B-system highly reliable access signal 1061 is asserted and the compared-result coincidence signal 1062 is asserted.

The transition condition 1309 is satisfied when the B-system highly reliable access signal 1061 is asserted but the compared-result coincident signal 1062 is not asserted.

The transition condition 1308 is satisfied when the transition conditions 1307 and 1309 are not satisfied but a constant time has elapsed.

The transition condition 1316 is satisfied when the B-system highly reliable access signal 1061 is asserted but the A-system highly reliable access signal 1060 is not asserted.

The transition condition 1315 is satisfied when the A-system highly reliable access signal 1060 is asserted and the compared-result coincident signal 1062 is asserted.

The transition condition 1312 is satisfied when the A-system highly reliable access signal 1060 is asserted, and the B-system highly reliable access signal 1061 is asserted, but the compared-result coincident signal 1062 is not asserted.

The transition condition 1313 is satisfied when the transitions 1315 and 1312 are not satisfied, but a constant time has elapsed.

The transition condition 1317 is satisfied when the A-system highly reliable access signal 1060 is asserted, and the B-system highly reliable access signal 1061 is asserted, but the compared-result coincident signal 1062 is not asserted.

The transition conditions 1310, 1311 and 1314 mean to be always satisfied and to shift to the state 1300 at the next cycle after the transition to the states 1302, 1303 and 1304.

The error detector 1012 manages that the A-system processor 1001 and B-system processor 1003 make access to the highly reliable IO 1018. The processors to make access to the highly reliable IO 1018 transit to states 1302, 1303 and 1304 when the outputs from both the processors are different or when either one of the processors does not make access to the highly reliable IO 1018 within a constant time. In these states 1302, 1303 and 1304, the failure report signal 1064 is asserted.

In addition, the highly reliable IO 1018, when the failure report signal 1064 is asserted, recognizes that a failure has occurred, thus making the output be switched to a stable state. Here, the stable state means that the current output is continued to keep or it is the same condition as the power supply is disconnected. Thus, the stable state differs for each object to be controlled. In addition, the error detector 1012 reports a failure interrupt using interrupt signals 1053 and 1054 to the A-system processor and B-system processor 1003 when a failure occurs. The processors that have received the failure interrupt immediately suspend the current processes and execute the failure process.

Figure 7:
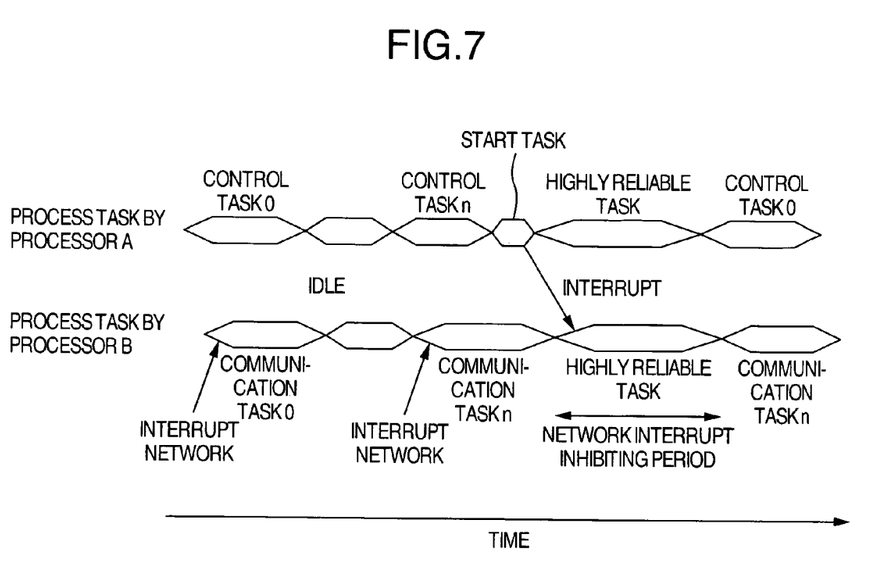
FIG. 7 is a timing chart showing the processing operation of two processors of the embodiments according to the invention.

FIG. 7 is a timing chart showing the normal processing operation of the A-system processor 1001 and B-system processor 1003.

When the A-system processor 1001 has finished the last control task n after processing the successive tasks from the control task 0, it executes a start task to start a B-system processor highly reliable task. This start task makes access to the B-system interrupt request register 1007 within the interrupt control portion 1005, thereby producing an interrupt to the B-system processor 1003, and it ends. Then, the A-system processor 1001 executes a highly reliable task. This highly reliable task controls the input/output device 1019 that is connected to the highly reliable IO 1018 and required for its reliability. The A-system processor 1001 periodically executes a sequence of processes from control task 0 to highly reliable task.

On the other hand, when the B-system processor 1003 executes communication tasks one after another according to the network interrupt produced from the network IO 1022 and receives the interrupt from the start task that the A-system processor 1001 executed, it executes the same highly reliable task as that in the A-system processor 1001. Thus, the A-system processor 1001 and B-system processor 1003 perform the same process, so that the operation can be guaranteed by the matching of the outputs from the two processors. After the end of the processing of the highly reliable task, the B-system processor 1003 again processes the communication tasks one after another according to the network interrupt 1066 produced from the network IO 1022. When the B-system processor 1003 receives the interrupt and finishes the process, it makes access to the interrupt control portion 1005, and clears the interrupt factor.

In addition, while the B-system processor 1003 is treating the interrupt produced when the B-system interrupt request register 1007 is accessed, the interrupt control portion 1005 masks the lower priority network interrupt 1066. Thus, the B-system processor 1003 does not suspend the processing because the network interrupt 1066 does not come while the B-system processor 1003 is executing the highly reliable task.

Thus, when the processing that guarantees high reliability is performed, the processing is performed by a plurality of processors. The outputs from the processors are compared with each other. Only when the compared result is judged to be coincident, the outputs are supplied. Therefore, the reliability is improved. The processing that does not attach importance to the reliability is performed by each of the plurality of processors independently, so that it can be more efficiently carried out.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A task management control apparatus having two systems which execute a same task operation on a common object of data processing to produce computations compatible with each other, said task management control apparatus comprising:
   a computation command unit that produces a computation command signal provided to said two systems;
   a data holding unit including a memory, which stores results of said operation executed by said two systems in response to said computation command signal, an individual address (ADDR) being assigned to each of said results of said operation by each of said two systems;
   a verification unit that compares the addresses assigned to said results of said operation stored in said data holding unit, and compares said results of said operation executed by said two systems stored in said data holding unit, thereby to determine whether the compared addresses are coincident with each other and the compared results of said operation are coincident with each other, wherein when the compared addresses are coincident with each other and further the compared results of said operation are coincident with each other, one of said results of said operation is output to said object of data processing; and
   an operation mode switching unit including: a first comparator which produces an abnormal output signal if a time difference measured from a time of receiving of a check mode start command from one system of said two systems indicative of a start of a check mode, to a time of receiving check mode ready signals indicative of completion of computations of said two systems, exceeds a predetermined value, and a second comparator which produces a second abnormal output signal if a period of time since receiving of the check mode ready signals from said two systems exceeds a second predetermined value;
   wherein at least one of the computation command unit and the verification unit is implemented via at least one processor.

2. A task management control apparatus according to claim 1, further comprising a delay unit which receives said computation command signal, delays said received computation command signal by a predetermined time and outputs the delayed computation command signal to one of said two systems.

3. A task management control apparatus according to claim 2, wherein said two systems are also configured to be selectable into an independent mode in which said two systems execute different computations on different objects of data processing, and both results of computations of said two systems are output.

4. A task management control apparatus according to claim 3, wherein under a condition of receiving a signal indicative that said different computations have been finished, another signal is generated, thus allowing said two systems to perform said compatible computations.

5. A task management control apparatus according to claim 3, wherein under a condition of receiving a signal indicative that said compatible computations have been finished, an independent mode signal is generated to provoke the independent mode, thus allowing said two systems to perform said different computations.

6. A task management control apparatus according to claim 3, wherein in said independent mode said two systems execute different computations on different objects of data processing;

said computation command unit produces a switching signal indicating that said two systems should make different computations; and said task management control apparatus further comprising a permission unit that allows said two systems to produce at least either one of the different processed results when said switching signal indicates that said two systems performed said different computations.

7. A task management control apparatus according to claim 6, wherein said permission unit compares write address data sent together with said processed results with predetermined data and thereby judges to allow said system to produce its output.

8. A task management control apparatus according to claim 7, further comprising a storage unit that stores said processed results in the order of being received, and supplying said stored processed results in order, wherein said predetermined data is compared with said processed results sequentially produced one after another.

9. A task management control apparatus according to claim 1, further comprising:
a first identification data region for storing identification data that identifies said object of which the data is processed by one of said two systems;
a second identification data region for storing identification data that identifies said object of which the data is processed by the other one of said two systems;
a first processed data region for storing first processed data as a processed result from said one of said two systems; and
a second processed data region for storing second processed data as a processed result from the other one of said two systems; wherein
said verification unit compares said first identification data and said second identification data, and compares said first processed data and said second processed data, thus said data being allowed to output on the basis of the comparing operation of said verification unit.

10. A task management control apparatus according to claim 1, wherein
said computation command unit outputs said computation command signal in case that said computation command unit received ready signals from said two systems indicating ready for starting to execute the same operation on the common object of data processing, and
said computation command unit outputs an abnormal output if a time period between receiving of the ready signal from one of said two systems and receiving the ready signal from other one of said two systems exceeds a preset range.

11. A task management control method implemented with respect to two systems which execute a same task operation on a common object of data processing to produce computations compatible with each other, said task management control method comprising:
producing a computation command signal provided to said two systems;
storing, via a memory, results of said operation executed by said two systems in response to said computation command signal, an individual address (ADDR) being assigned to each of said results of said operation by each of said two systems;
comparing addresses assigned to said results, and comparing said results of said operation executed by said two systems stored in said memory, thereby to determine whether the compared addresses are coincident with each other and whether the compared results of said operation are coincident with each other, wherein when the compared addresses are coincident with each other and further the compared results of said operation are coincident with each other, then outputting one of said results of said operation to said object of data processing; and
producing an abnormal output signal if a time difference measured from a time of receiving of a check mode start command from one system of said two systems indicative of a start of a check mode, to a time of receiving check mode ready signals indicative of completion of computations of said two systems, exceeds a predetermined value, and producing a second abnormal output signal if a period of time since receiving of the check mode ready signals from said two systems exceeds a second predetermined value;
wherein the task management control method is implemented at least in part via at least one processor.

12. A task management control method according to claim 11, wherein said two systems are also configured to be selectable into an independent mode in which said two systems execute different computations on different objects of data processing
said two systems output processed results when said two systems make different computations on data of different objects to be processed;
a switching signal indicating that said at least two systems should make said different computations is output; and
judging is made to allow at least one of said processed results to be output as one of said different results obtained from said two systems when said switching signal indicates that said two systems made different computations.

13. A task management control method according to claim 11, further comprising:
storing identification data for identifying said object of which the data is processed by one of said two systems in a first identification data region;
storing identification data for identifying said object of which the data is processed by the other one of said two systems in a second identification region;
storing first processed data as said processed result obtained from said one of said two systems in a first processed data region;
storing second processed data as the processed result obtained from the other one of said two systems in a second processed data region;
comparing said first identification data and said second identification data;
comparing said first processed data and said second processed data; and
allowing said data to be supplied on the basis of said comparing operations.

14. A task management control method according to claim 11, further comprising:
outputting said computation command signal in case that said computation command unit received ready signals from said two systems indicating ready for starting to execute the same operation on the common object of data processing, and
outputting an abnormal output if a time period between receiving of the ready signal from one of said two systems and receiving the ready signal from other one of said two systems exceeds a preset range.

* * * * *